(12) United States Patent
Ko

(10) Patent No.: US 12,416,793 B2
(45) Date of Patent: *Sep. 16, 2025

(54) OPTICAL IMAGING SYSTEM

(71) Applicant: SAMSUNG ELECTRO-MECHANICS CO., LTD., Suwon-si (KR)

(72) Inventor: Jung Hui Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 800 days.

This patent is subject to a terminal disclaimer.

(21) Appl. No.: 17/670,059

(22) Filed: Feb. 11, 2022

(65) Prior Publication Data

US 2022/0163777 A1 May 26, 2022

Related U.S. Application Data

(63) Continuation of application No. 16/357,954, filed on Mar. 19, 2019, now Pat. No. 11,280,983, which is a
(Continued)

(30) Foreign Application Priority Data

Oct. 19, 2015 (KR) .......................... 10-2015-0145258

(51) Int. Cl.
  *G02B 5/04* (2006.01)
  *G02B 5/20* (2006.01)
(Continued)

(52) U.S. Cl.
  CPC ........... *G02B 13/0065* (2013.01); *G02B 5/04* (2013.01); *G02B 9/60* (2013.01); *G02B 13/0045* (2013.01); *G02B 5/20* (2013.01)

(58) Field of Classification Search
  None
  See application file for complete search history.

(56) References Cited

U.S. PATENT DOCUMENTS

| 4,592,636 A | * | 6/1986 | Kato ...................... G03B 19/12 |
| | | | 396/384 |
| 5,880,879 A | | 3/1999 | Foo |
| (Continued) | | | |

FOREIGN PATENT DOCUMENTS

| CN | 101089672 A | 12/2007 |
| CN | 100460920 C | 2/2009 |
| (Continued) | | |

OTHER PUBLICATIONS

Gross, VCH Verlag Gmbh & Co. KGaA, vol. 3, pp. 378-379 (Year: 2007).*

(Continued)

*Primary Examiner* — William R Alexander
*Assistant Examiner* — Mackenzi Waddell
(74) *Attorney, Agent, or Firm* — NSIP Law

(57) ABSTRACT

An optical imaging system includes lenses. A prism is disposed adjacent to a first lens of the lenses and a second lens of the lenses, and is configured to refract light from the first lens to the second lens. A reflecting member is disposed adjacent to a fifth lens of the lenses and an imaging plane, and is configured to reflect light from the fifth lens to the imaging plane.

18 Claims, 12 Drawing Sheets

Related U.S. Application Data continuation of application No. 15/095,668, filed on Apr. 11, 2016, now Pat. No. 10,288,850.

(51) Int. Cl.
*G02B 9/60* (2006.01)
*G02B 13/00* (2006.01)

(56) References Cited

U.S. PATENT DOCUMENTS

| | | | |
|---|---|---|---|
| 6,510,008 | B1 | 1/2003 | Miyauchi et al. |
| 6,985,305 | B2 | 1/2006 | Takeuchi |
| 7,239,457 | B2 | 7/2007 | Kushida et al. |
| 8,395,854 | B2 | 3/2013 | Takakubo et al. |
| 8,849,107 | B2 | 9/2014 | Nomura et al. |
| 9,338,357 | B2 | 5/2016 | Nomura et al. |
| 9,557,627 | B2 | 1/2017 | Mercado |
| 9,874,734 | B2 | 1/2018 | Takakubo et al. |
| 10,288,850 | B2 | 5/2019 | Ko |
| 2004/0005148 | A1 | 1/2004 | Ogata et al. |
| 2004/0105025 | A1* | 6/2004 | Scherling ............ G03B 17/17 348/E5.025 |
| 2004/0196571 | A1* | 10/2004 | Shinohara ............ G02B 13/06 359/680 |
| 2005/0024737 | A1 | 2/2005 | Takeuchi |
| 2006/0132851 | A1 | 6/2006 | Kim |
| 2007/0024992 | A1 | 2/2007 | Kushida et al. |
| 2007/0126911 | A1 | 6/2007 | Nanjo |
| 2008/0144193 | A1 | 6/2008 | Adachi |
| 2008/0170300 | A1 | 7/2008 | Kanetaka et al. |
| 2008/0225405 | A1 | 9/2008 | Kuroda et al. |
| 2009/0052052 | A1 | 2/2009 | Yamano |
| 2010/0103539 | A1 | 4/2010 | Kitahara |
| 2012/0075717 | A1 | 3/2012 | Tada |
| 2012/0075726 | A1 | 3/2012 | Takakubo et al. |
| 2012/0075727 | A1* | 3/2012 | Takakubo ............ G02B 13/0065 359/737 |
| 2012/0147479 | A1 | 6/2012 | Hayakawa |
| 2013/0094095 | A1 | 4/2013 | Minefuji |
| 2014/0086568 | A1 | 3/2014 | Nomura et al. |
| 2015/0103417 | A1 | 4/2015 | Nomura et al. |
| 2015/0110480 | A1 | 4/2015 | Suzuka |
| 2015/0215542 | A1 | 7/2015 | Nomura et al. |
| 2015/0253647 | A1 | 9/2015 | Mercado |
| 2015/0316748 | A1 | 11/2015 | Cheo et al. |
| 2015/0338617 | A1 | 11/2015 | Nie et al. |
| 2016/0070088 | A1 | 3/2016 | Koguchi |
| 2017/0068078 | A1 | 3/2017 | Takakubo et al. |
| 2017/0108669 | A1 | 4/2017 | Kim |

FOREIGN PATENT DOCUMENTS

| | | | |
|---|---|---|---|
| CN | 102419470 | A | 4/2012 |
| CN | 103955049 | A | 7/2014 |
| CN | 203870321 | U | 10/2014 |
| CN | 204009207 | U * | 12/2014 |
| CN | 204009209 | U * | 12/2014 |
| CN | 104865773 | A | 8/2015 |
| CN | 104898352 | A | 9/2015 |
| CN | 106501925 | A | 3/2017 |
| CN | 106597650 | A | 4/2017 |
| JP | 2004-247887 | A | 9/2004 |
| JP | 2007-34103 | A | 2/2007 |
| JP | 2010-107532 | A | 5/2010 |
| JP | 2012-068510 | A | 4/2012 |
| KR | 10-2005-0074594 | A | 7/2005 |
| KR | 10-2006-0071286 | A | 6/2006 |
| KR | 10-2007-0004250 | A | 1/2007 |
| KR | 10-2013-0024160 | A | 3/2013 |
| TW | 2015-39026 | A | 10/2015 |
| WO | WO 2004/044638 | A1 | 5/2004 |

OTHER PUBLICATIONS

Taiwanese Office Action issued on Apr. 19, 2017 in corresponding Taiwanese Patent Application No. 105110677 (8 pages in English, 9 pages in Taiwanese).

Korean Office Action issued on Apr. 25, 2017, in corresponding Korean Patent Application No. 10-2015-0145258 (5 pages in English, 4 pages in Korean).

Chinese Office Action issued on Jun. 29, 2018 in counterpart Chinese Patent Application No. 201610273679.0 (31 pages, in Chinese with English translation).

Chinese Office Action issued on Oct. 27, 2021, in counterpart Chinese Patent Application No. 202010857751.0 (13 pages in English and 9 pages in Chinese).

* cited by examiner

| FIRST EMBODIMENT ||||||
| --- | --- | --- | --- | --- | --- |
| f = 9.70  F number = 2.75 ||||||
| SURFACE NO. | RADIUS OF CURVATURE | THICKNESS/ DISTANCE | REFRACTIVE INDEX (Ni) | ABBE NUMBER (νi) | FOCAL LENGTH |
| S1  FIRST LENS | -100.7810 | 0.3500 | 1.603 | 38.010 | -8.745 |
| S2 | 5.5760 | 0.4900 | | | |
| S3 | infinity | 2.0000 | 1.878 | 38.200 | |
| S4  PRISM | infinity | 0.0000 | | | |
| S5 | infinity | 2.0000 | 1.878 | 38.200 | |
| S6 | infinity | 0.1100 | | | |
| S7  SECOND LENS | 561.6100 | 0.9900 | 1.544 | 56.090 | 12.708 |
| S8 | -6.9960 | 0.1000 | | | |
| S9  THIRD LENS | 5.2140 | 1.4500 | 1.544 | 56.090 | 8.937 |
| S10 | -65.1110 | 3.4100 | | | |
| S11  FOURTH LENS | -12.3690 | 0.4000 | 1.614 | 25.950 | -5.342 |
| S12 | 4.5230 | 2.7700 | | | |
| S13  FIFTH LENS | 6.7110 | 1.4000 | 1.544 | 56.090 | 7.625 |
| S14 | -10.0690 | 5.5200 | | | |
| S15  FILTER | infinity | 0.1100 | 1.517 | 64.170 | |
| S16 | infinity | 0.3000 | | | |
| S17  IMAGING PLANE | infinity | 0.0000 | | | |

FIG. 3

| SURFACE NO. | k | A | B | C | D | E | F | G | H |
|---|---|---|---|---|---|---|---|---|---|
| S7 | 1.00000 | -0.00038 | 0.00008 | 0.00000 | 0.00000 | 0.00000 | 0.00000 | 0.00000 | 0.00000 |
| S8 | 0.03308 | 0.00063 | 0.00003 | 0.00000 | 0.00000 | 0.00000 | 0.00000 | 0.00000 | 0.00000 |
| S9 | -0.03940 | 0.00034 | 0.00005 | 0.00000 | 0.00000 | 0.00000 | 0.00000 | 0.00000 | 0.00000 |
| S10 | -99.00000 | -0.00079 | 0.00014 | -0.00001 | 0.00000 | 0.00000 | 0.00000 | 0.00000 | 0.00000 |
| S11 | 1.92557 | 0.00166 | -0.00018 | -0.00005 | 0.00000 | 0.00000 | 0.00000 | 0.00000 | 0.00000 |
| S12 | -3.68697 | 0.00461 | -0.00007 | -0.00003 | -0.00001 | 0.00000 | 0.00000 | 0.00000 | 0.00000 |
| S13 | 0.00000 | -0.00154 | 0.00005 | 0.00001 | 0.00000 | 0.00000 | 0.00000 | 0.00000 | 0.00000 |
| S14 | -1.00000 | 0.00009 | 0.00005 | -0.00001 | 0.00000 | 0.00000 | 0.00000 | 0.00000 | 0.00000 |

FIG. 4

| SECOND EMBODIMENT ||||||
| --- | --- | --- | --- | --- | --- |
| f = 10.00   F number = 2.75 ||||||
| SURFACE NO. | RADIUS OF CURVATURE | THICKNESS/ DISTANCE | REFRACTIVE INDEX ($N_i$) | ABBE NUMBER ($v_i$) | FOCAL LENGTH |
| S1    FIRST LENS | -100.7810 | 0.3500 | 1.603 | 38.010 | -8.889 |
| S2 | 5.6730 | 0.5100 | | | |
| S3 | infinity | 1.9400 | 1.878 | 38.200 | |
| S4    PRISM | infinity | 0.0000 | | | |
| S5 | infinity | 1.9400 | 1.878 | 38.200 | |
| S6 | infinity | 0.1300 | | | |
| S7    SECOND LENS | 1423.8600 | 0.9600 | 1.544 | 56.090 | 12.649 |
| S8 | -6.9140 | 0.1000 | | | |
| S9    THIRD LENS | 5.2350 | 1.4900 | 1.544 | 56.090 | 9.191 |
| S10 | -100.5890 | 3.4700 | | | |
| S11   FOURTH LENS | -13.1890 | 0.4200 | 1.614 | 25.950 | -5.438 |
| S12 | 4.5290 | 2.8800 | | | |
| S13   FIFTH LENS | 6.8610 | 1.3900 | 1.544 | 56.090 | 7.780 |
| S14 | -10.2630 | 5.5900 | | | |
| S15   FILTER | infinity | 0.1100 | 1.517 | 64.170 | |
| S16 | infinity | 0.3000 | | | |
| S17  IMAGING PLANE | infinity | 0.0000 | | | |

FIG. 7

| SURFACE NO. | k | A | B | C | D | E | F | G | H |
|---|---|---|---|---|---|---|---|---|---|
| S7 | 1.00000 | -0.00037 | 0.00008 | 0.00000 | 0.00000 | 0.00000 | 0.00000 | 0.00000 | 0.00000 |
| S8 | 0.03555 | 0.00063 | 0.00003 | 0.00000 | 0.00000 | 0.00000 | 0.00000 | 0.00000 | 0.00000 |
| S9 | -0.03985 | 0.00035 | 0.00005 | 0.00000 | 0.00000 | 0.00000 | 0.00000 | 0.00000 | 0.00000 |
| S10 | -99.00000 | -0.00079 | 0.00014 | -0.00001 | 0.00000 | 0.00000 | 0.00000 | 0.00000 | 0.00000 |
| S11 | 2.24530 | 0.00164 | -0.00018 | -0.00004 | -0.00001 | 0.00000 | 0.00000 | 0.00000 | 0.00000 |
| S12 | -3.63716 | 0.00464 | -0.00007 | -0.00003 | 0.00000 | 0.00000 | 0.00000 | 0.00000 | 0.00000 |
| S13 | 0.00000 | -0.00151 | 0.00005 | 0.00001 | 0.00000 | 0.00000 | 0.00000 | 0.00000 | 0.00000 |
| S14 | -1.00000 | -0.00002 | 0.00005 | -0.00001 | 0.00000 | 0.00000 | 0.00000 | 0.00000 | 0.00000 |

FIG. 8

| \multicolumn{6}{c}{THIRD EMBODIMENT} | | | | | |
|---|---|---|---|---|---|
| f = 11.00 | F number = 2.77 | | | | |

| SURFACE NO. | | RADIUS OF CURVATURE | THICKNESS/ DISTANCE | REFRACTIVE INDEX (Ni) | ABBE NUMBER (νi) | FOCAL LENGTH |
|---|---|---|---|---|---|---|
| S1 | FIRST LENS | -100.7810 | 0.3500 | 1.603 | 38.010 | -10.234 |
| S2 | | 6.5870 | 0.3700 | | | |
| S3 | | infinity | 2.0000 | 1.878 | 38.200 | |
| S4 | PRISM | infinity | 0.0000 | | | |
| S5 | | infinity | 2.0000 | 1.878 | 38.200 | |
| S6 | | infinity | 0.3700 | | | |
| S7 | SECOND LENS | 86.8910 | 0.9800 | 1.544 | 56.090 | 12.257 |
| S8 | | -7.1950 | 0.1000 | | | |
| S9 | THIRD LENS | 5.5180 | 1.5000 | 1.544 | 56.090 | 10.460 |
| S10 | | 164.0610 | 3.5200 | | | |
| S11 | FOURTH LENS | -18.5290 | 0.5600 | 1.614 | 25.950 | -5.570 |
| S12 | | 4.2460 | 3.5600 | | | |
| S13 | FIFTH LENS | 6.6440 | 1.4300 | 1.544 | 56.090 | 8.285 |
| S14 | | -12.9590 | 5.5100 | | | |
| S15 | FILTER | infinity | 0.1100 | 1.517 | 64.170 | |
| S16 | | infinity | 0.3000 | | | |
| S17 | IMAGING PLANE | infinity | 0.0000 | | | |

FIG. 11

| SURFACE NO. | k | A | B | C | D | E | F | G | H |
|---|---|---|---|---|---|---|---|---|---|
| S7 | 1.00000 | -0.00037 | 0.00007 | 0.00000 | 0.00000 | 0.00000 | 0.00000 | 0.00000 | 0.00000 |
| S8 | -0.06862 | 0.00069 | 0.00003 | 0.00000 | 0.00000 | 0.00000 | 0.00000 | 0.00000 | 0.00000 |
| S9 | -0.01404 | 0.00039 | 0.00005 | 0.00000 | 0.00000 | 0.00000 | 0.00000 | 0.00000 | 0.00000 |
| S10 | 99.00000 | -0.00077 | 0.00014 | -0.00001 | 0.00000 | 0.00000 | 0.00000 | 0.00000 | 0.00000 |
| S11 | 6.57983 | 0.00150 | -0.00013 | -0.00003 | 0.00000 | 0.00000 | 0.00000 | 0.00000 | 0.00000 |
| S12 | -3.33068 | 0.00482 | -0.00009 | -0.00003 | 0.00000 | 0.00000 | 0.00000 | 0.00000 | 0.00000 |
| S13 | 0.00000 | -0.00130 | 0.00004 | 0.00000 | 0.00000 | 0.00000 | 0.00000 | 0.00000 | 0.00000 |
| S14 | -1.00000 | -0.00809 | 0.00003 | -0.00001 | 0.00000 | 0.00000 | 0.00000 | 0.00000 | 0.00000 |

FIG. 12

OPTICAL IMAGING SYSTEM

CROSS-REFERENCE TO RELATED APPLICATION(S)

This application is a continuation of U.S. patent application Ser. No. 16/357,954 filed on Mar. 19, 2019, now U.S. Pat. No. 11,280,983 issued on Mar. 22, 2022, which is a continuation of U.S. patent application Ser. No. 15/095,668 filed on Apr. 11, 2016, now U.S. Pat. No. 10,288,850 issued on May 14, 2019, which claims the benefit under 35 USC 119 (a) of Korean Patent Application No. 10-2015-0145258 filed on Oct. 19, 2015, in the Korean Intellectual Property Office, the entire disclosures of which are incorporated herein by reference for all purposes.

BACKGROUND

1. Field

The following description relates to an optical imaging system including a prism.

2. Description of Related Art

An optical imaging system commonly includes a plurality of lenses. For example, four or more lenses are desired in order to improve the resolution of an optical imaging system. An optical imaging system including a plurality of lenses has a significant length. For this reason, it is not easy to mount the optical imaging system including the plurality of lenses in an electronic device that is desired to be thinned, such as a mobile phone.

Therefore, there is a desire to develop an optical imaging system capable to be easily mounted in a thinned electronic device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes lenses. A prism is disposed adjacent to a first lens of the lenses and a second lens of the lenses, and is configured to refract light from the first lens to the second lens. A reflecting member is disposed adjacent to a fifth lens of the lenses and an imaging plane, and is configured to reflect light from the fifth lens to the imaging plane.

The first lens may have a negative refractive power. The second lens may have a positive refractive power. A third lens of the lenses may have a positive refractive power. A fourth lens of the lenses may have a negative refractive power. The fifth lens may have a positive refractive power.

Two surfaces of the first lens may be concave. Two surfaces of the second lens may be convex. An object-side surface of a third lens of the lenses may be convex. Two surfaces of a fourth lens of the lenses may be concave. Two surfaces of the fifth lens may be convex.

A ratio of a distance between an object-side surface of the first lens and an image-side surface of the prism to an overall focal length of the optical imaging system may be less than 0.5.

A refractive index of the prism may be less than two.

The optical imaging may further include a filter disposed between the reflecting member and the imaging plane. A refractive index of the filter may be less than 1.66.

The first lens may be substantially perpendicular to the second lens and the fifth lens may be substantially perpendicular to the imaging plane.

In another general aspect, an optical imaging system includes a first lens having a first optical axis, a second lens, a third lens, a fourth lens and a fifth lens, wherein the second lens, third lens, fourth lens and fifth lens are arranged along a second optical axis, an imaging plane having a third optical axis parallel to the first optical axis, a prism disposed adjacent to the first lens and the second lens, configured to refract light from the first lens to the second lens, and a reflecting member disposed adjacent to the fifth lens and the imaging plane, and configured to reflect light from the fifth lens to the imaging plane.

The first lens may be disposed toward an object-side of the optical imaging system, and the first optical axis may be substantially perpendicular to the second optical axis.

In another general aspect, an optical imaging system includes a first lens, a last lens, a prism disposed adjacent to the first lens and a second lens, configured to refract light from the first lens to the second lens, and a reflecting member disposed adjacent to the last lens and an imaging plane, and configured to reflect light from the fifth lens to the imaging plane. An optical axis of the first lens is substantially perpendicular to an optical axis of the second lens, and the last lens is substantially perpendicular to the imaging plane. The optical imaging system may further include lenses disposed between the prism and the last lens.

Other features and aspects will be apparent from the following detailed description, the drawings, and the claims

BRIEF DESCRIPTION OF DRAWINGS

FIG. 3 is a table representing characteristics of lenses of the optical imaging system illustrated in FIG. 1;

FIG. 4 is a table representing aspherical characteristics of the optical imaging system illustrated in FIG. 1;

FIG. 7 is a table representing characteristics of lenses of the optical imaging system illustrated in FIG. 5;

FIG. 8 is a table representing aspherical characteristics of the optical imaging system illustrated in FIG. 5;

FIG. 11 is a table representing characteristics of lenses of the optical imaging system illustrated in FIG. 9; and FIG. 12 is a table representing aspherical characteristics of the optical imaging system illustrated in FIG. 9.

DETAILED DESCRIPTION

Figure 1:
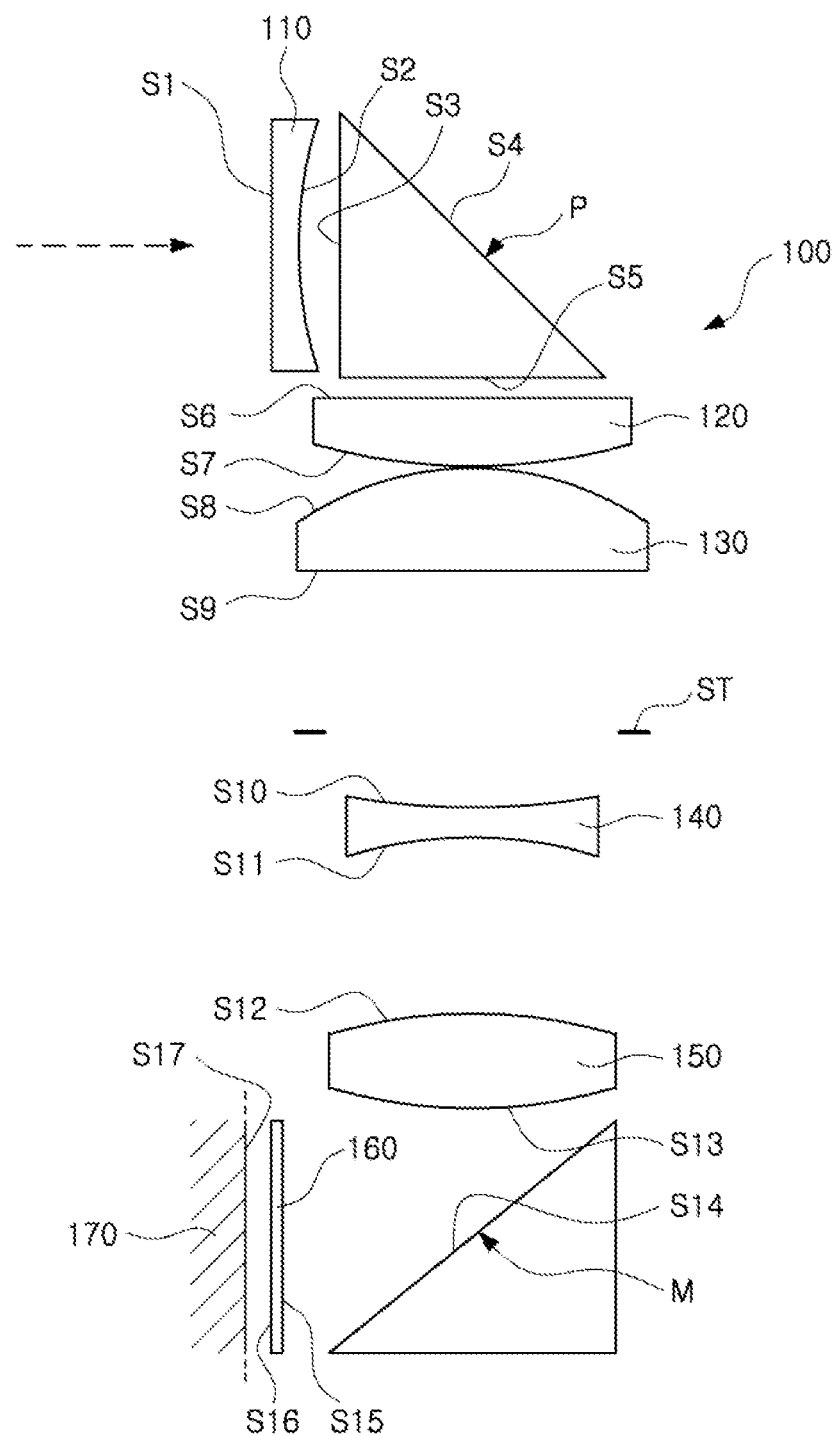
FIG. 1 is a view of an optical imaging system according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or lens, is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation.

The terminology used herein is for describing particular embodiments only and is not intended to be limiting of the description. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

In addition, a first lens refers to a lens closest to an object (or a subject), while a last lens, e.g. a fifth lens, refers to a lens closest to an imaging plane (or an image sensor). In addition, all radii of curvature and thicknesses of lenses, a TTL, an ImgH (i.e. one half of a diagonal length of the imaging plane), and focal lengths are represented in millimeters (mm). Further, thicknesses of the lenses, gaps between the lenses, and the TTL are distances on optical axes of the lenses. Further, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, although it is described that one surface of a lens is convex, an edge portion of the lens may be concave. Likewise, although it is described that one surface of a lens is concave, an edge portion of the lens may be convex.

An optical imaging system includes an optical system having a plurality of lenses. For example, the optical system of the optical imaging system may include five lenses having refractive power. However, the optical imaging system is not limited to only lenses having a refractive power. For example, the optical imaging system may include a stop for controlling an amount of light. In addition, the optical imaging system may further include an infrared cut-off filter filtering infrared light. Further, the optical imaging system may further include an image sensor (that is, an imaging device) converting light reflected from a subject incident thereto through the optical system into electrical signals. Further, the optical imaging system may further include a gap maintaining member adjusting a gap between lenses.

First to fifth lenses may be formed of materials having a refractive index different from that of air. For example, the first to fifth lenses may be formed of plastic or glass. At least one of the first to fifth lenses may have an aspherical shape. As an example, only the fifth lens of the first to fifth lenses may have the aspherical shape. In addition, at least one surface of all of the first to fifth lenses may be aspherical. Here, an aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18}$$ [Equation 1]

Here, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance Y and a tangential plane meeting the apex of the aspherical surface of the lens.

The optical imaging system may include five lenses, a prism, a reflecting member, a filter, an image sensor, and a stop. Next, the above-mentioned components will be described.

The first lens may have refractive power. For example, the first lens may have negative refractive power. At least one surface of the first lens may be concave. For example, an object-side surface of the first lens may be concave.

The first lens may have a spherical surface. For example, both surfaces of the first lens may be spherical. The first lens may be formed of a material having high light transmissivity and excellent workability. For example, the first lens may be formed of plastic, such as polycarbonate. However, a material of the first lens is not limited to the plastic. For example, the first lens may be formed of glass.

The second lens may have refractive power. For example, the second lens may have positive refractive power. At least one surface of the second lens may be convex. For example, an image-side surface of the second lens may be convex.

The second lens may have an aspherical surface. For example, an object-side surface of the second lens may be aspherical. The second lens may be formed of a material having high light transmissivity and excellent workability. For example, the second lens may be formed of plastic, such as polycarbonate. However, a material of the second lens is not limited to the plastic. For example, the second lens may be formed of glass.

The third lens may have refractive power. For example, the third lens may have positive refractive power. At least one surface of the third lens may be convex. For example, an object-side surface of the third lens may be convex.

The third lens may have an aspherical surface. For example, an image-side surface of the third lens may be aspherical. The third lens may be formed of a material having high light transmissivity and excellent workability. For example, the third lens may be formed of plastic, such as polycarbonate. However, a material of the third lens is not limited to the plastic. For example, the third lens may be formed of glass.

The fourth lens may have refractive power. For example, the fourth lens may have negative refractive power. The fourth lens may have a meniscus shape. For example, an image-side surface of the fourth lens may be concave.

The fourth lens may have an aspherical surface. For example, both surfaces of the fourth lens may be aspherical. The fourth lens may be formed of a material having high light transmissivity and excellent workability. For example, the fourth lens may be formed of plastic, such as polycarbonate. However, a material of the fourth lens is not limited to plastic. For example, the fourth lens may be formed of glass.

The fifth lens may have refractive power. For example, the fifth lens may have positive refractive power. At least one surface of the fifth lens may be convex. For example, both surfaces of the fifth lens may be convex.

The fifth lens may have an aspherical surface. For example, both surfaces of the fifth lens may be aspherical. The fifth lens may be formed of a material having high light transmissivity and excellent workability. For example, the fifth lens may be formed of plastic, such as polycarbonate. However, a material of the fifth lens is not limited to the plastic. For example, the fifth lens may be formed of glass.

In the configurations of the lenses as described above, the second to fifth lenses are arranged in the same direction, while the first lens is arranged in a direction different from the direction in which the second to fifth lenses are arranged. For example, an optical axis of the first lens may be substantially perpendicular to an optical axis of the second lens.

The filter may filter a partial wavelength from incident light incident through the first to fifth lenses. For example, the filter may filter an infrared wavelength of the incident light.

The filter may be manufactured to have a thin thickness. To this end, the filter may be formed of plastic.

The image sensor may be configured to realize high resolution. For example, a unit size of pixels configuring the image sensor may be 1.12 μm or less. The image sensor is disposed in a direction different from the direction in which the second to fifth lenses are disposed. For example, an optical axis of the image sensor is substantially perpendicular to the optical axis of the second lens. The optical axis of the image sensor is substantially parallel to the optical axis of the first lens is disposed. The image sensor may be disposed to be close to an object side. For example, the image sensor is disposed to be closer to the object side, as compared with the second to fifth lenses.

The stop may be disposed in order to adjust an amount of light incident to the lenses. For example, the stop may be disposed between the second and third lenses.

The prism is between the first lens and the second lens. The prism refracts incident light from the first lens to the second lens.

The reflecting member is disposed between the fifth lens and the image sensor. The reflecting member reflects light irradiated from the fifth lens to the image sensor (or the imaging plane).

In the optical imaging system configured as described above, a distance from the object-side surface of the first lens to the imaging plane may be sufficiently secured, such that an optical design may be free. In addition, the optical imaging system according to one or more embodiments may have an optical axis that is bent, such that the optical imaging system may be mounted in a length direction of an electronic device. Therefore, the optical imaging system according to one or more embodiments may be easily mounted in a thin mobile phone, or other device.

The optical imaging system satisfies the following Conditional Expressions:

$$Dp/f < 0.5$$

$$Np < 2.0$$

$$Nf < 1.66$$

$$2.0 < Yt/BFL$$

$$Yt/Y < 1.0.$$

Here, f is an overall focal length of the optical imaging system, Dp is a distance from the object-side surface of the first lens to an image-side surface of the prism, BFL is a distance from an image-side surface of the fifth lens to the imaging plane, Np is a refractive index of the prism, Nf is a refractive index of the filter, Yt is a length from the center of the imaging plane to a side of the imaging plane, and Y is ½ of a diagonal length of the imaging plane.

The optical imaging system satisfying the above Conditional Expressions may be miniaturized, and allow high resolution images to be realized. The optical imaging systems according to one or more embodiments will be described.

First, an optical imaging system according to a first embodiment will be described with reference to FIG. 1. The optical imaging system 100 according to the first embodiment includes an optical system including a first lens 110, a second lens 120, a third lens 130, a fourth lens 140, and a fifth lens 150.

The first lens 110 has a negative refractive power, and an object-side first surface S1 and an image-side second surface S2 of the first lens 110 are concave. The second lens 120 has positive refractive power, and an object-side sixth surface S6 and an image-side seventh surface S7 of the second lens 120 are convex. The third lens 130 has a positive refractive power, and an object-side eighth surface S8 and an image-side ninth surface S9 of the third lens 130 are convex. The fourth lens 140 has a negative refractive power, and an object-side tenth surface S10 and an image-side eleventh surface S11 of the fourth lens 140 are concave. The fifth lens 150 may have positive refractive power, and an object-side twelfth surface S12 and an image-side thirteenth surface S13 of the fifth lens 150 are convex.

The optical imaging system 100 further includes a prism P, a reflecting member M, a filter 160, an image sensor 170, and a stop ST.

The prism P is disposed adjacent to the first lens 110 and the second lens 120. The second lens 120 is substantially perpendicular to the first lens 110. The prism P refracts incident light from the first lens 110 to the second lens 120. The prism P incudes an object-side third surface S3, a fourth surface S4, and an image-side fifth surface S5.

The reflecting member M is disposed adjacent to the fifth lens 150 and the image sensor 170. The fifth lens 150 is substantially perpendicular to the image sensor 170. The reflecting member M reflects incident light from the fifth lens 150 to the image sensor 170. The reflecting member M incudes a fourteenth surface S14 and the image sensor 170 includes a seventeenth surface S17.

The filter 160 is disposed between the reflecting member M and the image sensor 170. The stop ST is disposed between the second lens 120 and the third lens 130. The filter includes a fifteenth surface S15 and a sixteenth surface S16.

Figure 2:
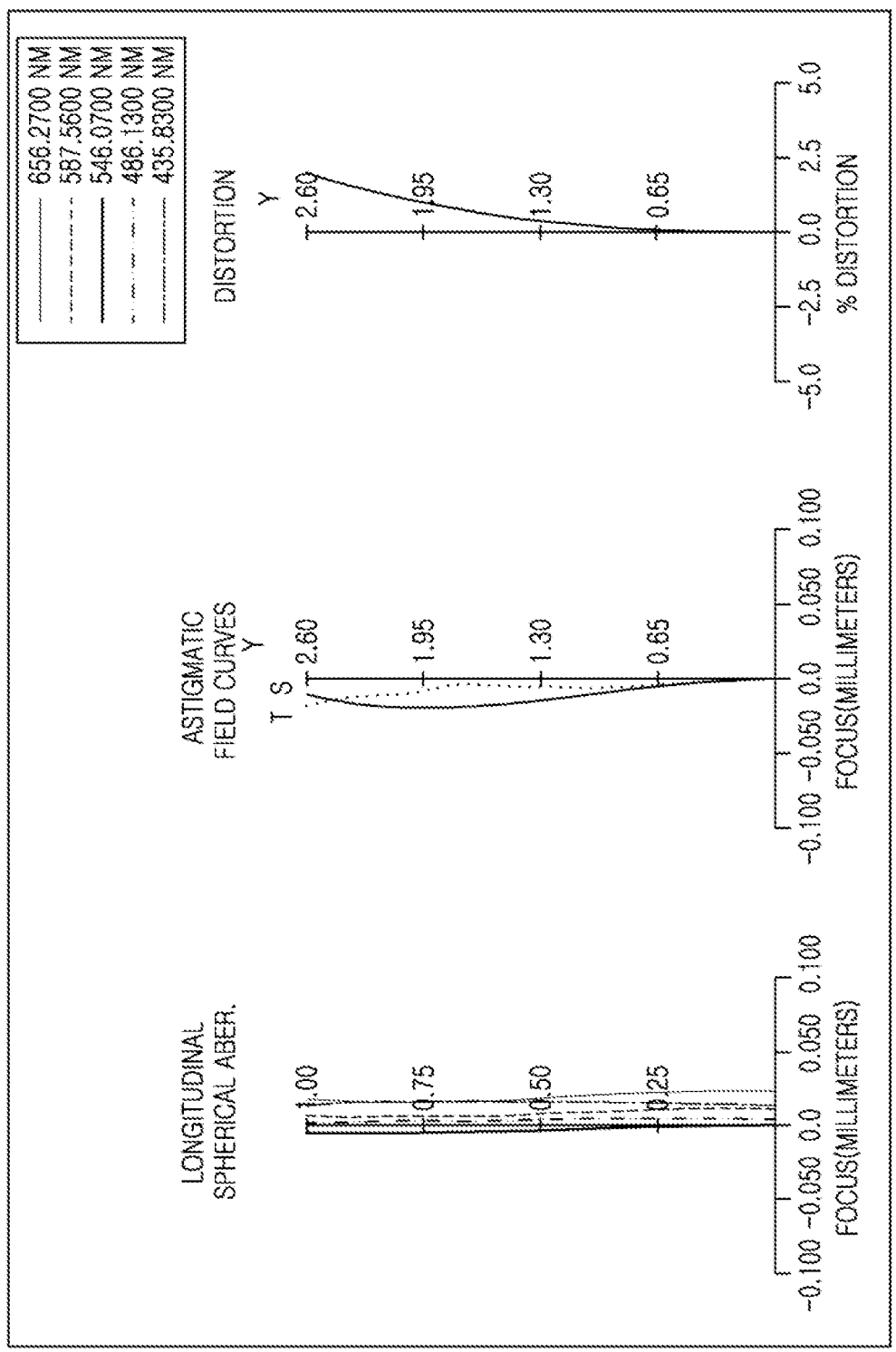
FIG. 2 is graphs representing aberration curves of the optical imaging system illustrated in FIG. 1.

The optical imaging system 100 configured as described above has aberration characteristics as illustrated in FIG. 2. FIGS. 3 and 4 are tables representing characteristics of lenses and aspherical characteristics of the optical imaging system according to the first embodiment.

Figure 5:
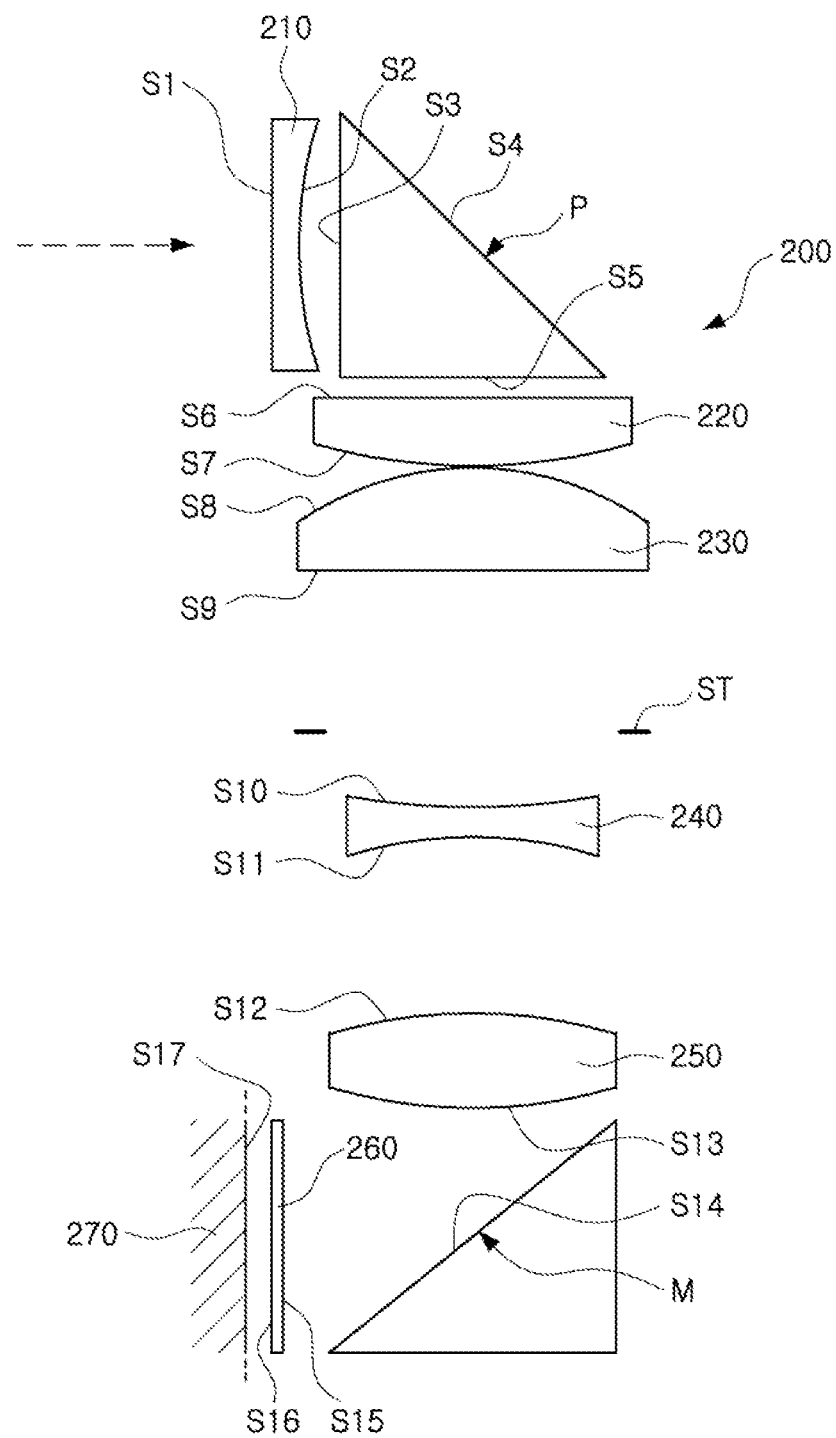
FIG. 5 is a view of an optical imaging system according to a second embodiment.

An optical imaging system according to a second embodiment will be described with reference to FIG. 5.

The optical imaging system 200 according to the second embodiment includes an optical system including a first lens 210, a second lens 220, a third lens 230, a fourth lens 240, and a fifth lens 250.

The first lens 210 has a negative refractive power, and an object-side first surface S1 and an image-side second surface S2 of the first lens 210 are concave. The second lens 220 has a positive refractive power, and an object-side sixth surface S6 and an image-side seventh surface S7 of the second lens 220 are convex. The third lens 230 has a positive refractive power, and an object-side eighth surface S8 an image-side ninth surface S9 of the third lens 230 are convex. The fourth lens 240 has a negative refractive power, and an object-side tenth surface S10 and an image-side eleventh surface S11 of the fourth lens 240 are concave. The fifth lens 250 has a positive refractive power, and an object-side twelfth surface S12 and an image-side thirteenth surface S13 of the fifth lens 150 are convex.

The optical imaging system 200 further includes a prism P, a reflecting member M, a filter 260, an image sensor 270, and a stop ST.

The prism P is disposed adjacent to the first lens 210 and the second lens 220. The second lens 220 is substantially perpendicular to the first lens 210. The prism P refracts incident light from the first lens 210 to the second lens 220. The prism P incudes an object-side third surface S3, a fourth surface S4, and an image-side fifth surface S5.

The reflecting member M is disposed adjacent to the fifth lens 250 and the image sensor 270. The fifth lens 250 is substantially perpendicular to the image sensor 270. The reflecting member M reflects incident light from the fifth lens 250 to the image sensor 270. The reflecting member M incudes a fourteenth surface S14 and the image sensor 270 includes a seventeenth surface S17.

The filter 260 is disposed between the reflecting member M and the image sensor 270. The stop ST is disposed between the second lens 220 and the third lens 230. The filter includes a fifteenth surface S15 and a sixteenth surface S16.

Figure 6:
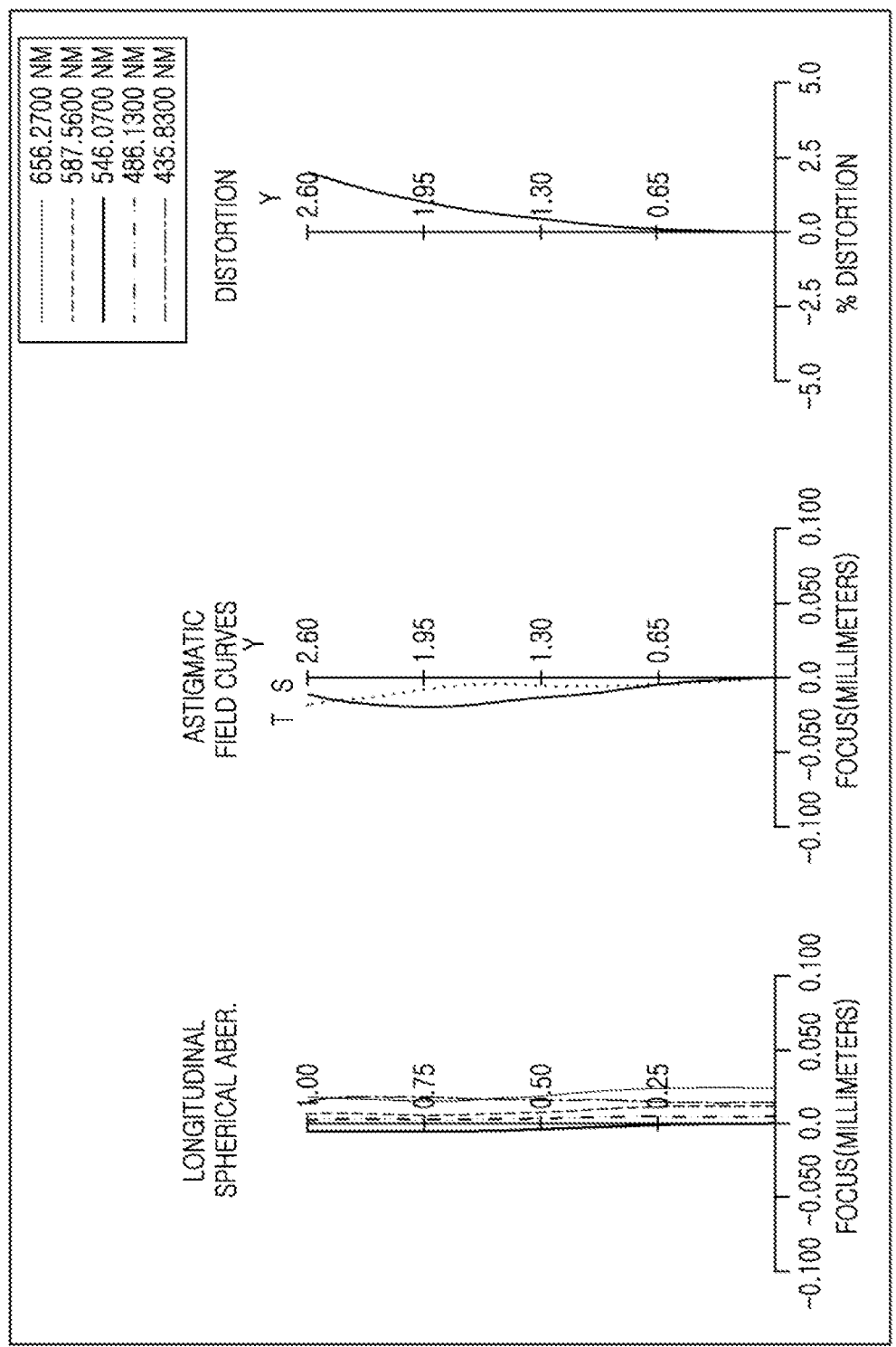
FIG. 6 is graphs representing aberration curves of the optical imaging system illustrated in FIG. 5.

The optical imaging system 200 configured as described above has aberration characteristics as illustrated in FIG. 6. FIGS. 7 and 8 are tables representing characteristics of lenses and aspherical characteristics of the optical imaging system according to the second embodiment.

Figure 9:
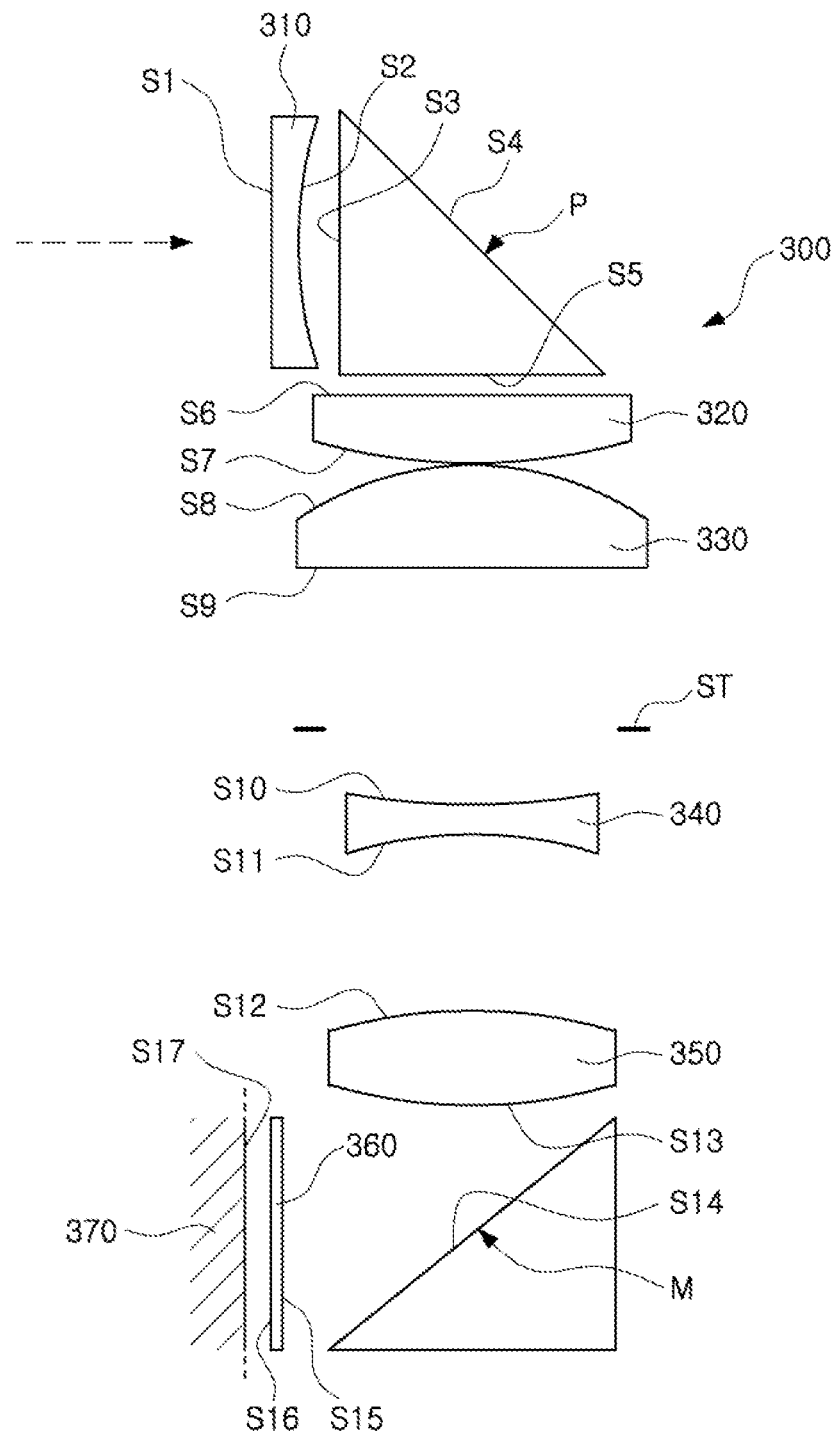
FIG. 9 is a view of an optical imaging system according to a third embodiment.

An optical imaging system according to a third embodiment will be described with reference to FIG. 9.

The optical imaging system 300 according to the third embodiment includes an optical system including a first lens 310, a second lens 320, a third lens 330, a fourth lens 340, and a fifth lens 350.

The first lens 310 has a negative refractive power, and an object-side first surface and an image-side second surface S2 of the first lens 310 are concave. The second lens 320 has a positive refractive power, and an object-side sixth surface S6 and an image-side seventh surface S7 of the second lens 320 are convex. The third lens 330 has a positive refractive power, and an object-side eighth surface S8 and an image-side ninth surface S9 of the third lens 330 are convex. The fourth lens 340 has a negative refractive power, and an object-side tenth surface S10 and an image-side eleventh surface S11 of the fourth lens 340 are concave. The fifth lens 350 has a positive refractive power, and an object-side twelfth surface S12 and an image-side thirteenth surface S13 of the fifth lens 350 are convex.

The optical imaging system 300 further includes a prism P, a reflecting member M, a filter 360, an image sensor 370, and a stop ST.

The prism P is disposed adjacent to the first lens 310 and the second lens 320. The second lens 320 is substantially perpendicular to the first lens 310. The prism P refracts incident from the first lens 310 to the second lens 320. The prism P incudes an object-side third surface S3, a fourth surface S4, and an image-side fifth surface S5.

The reflecting member M is disposed adjacent to the fifth lens 350 and the image sensor 370. The fifth lens 350 is substantially perpendicular to the image sensor 370. The reflecting member M reflects incident light from the fifth lens 350 to the image sensor 370. The reflecting member M incudes a fourteenth surface S14 and the image sensor 370 includes a seventeenth surface S17.

The filter 360 is disposed between the reflecting member M and the image sensor 370. The stop ST is disposed between the second lens 320 and the third lens 330. The filter includes a fifteenth surface S15 and a sixteenth surface S16.

Figure 10:
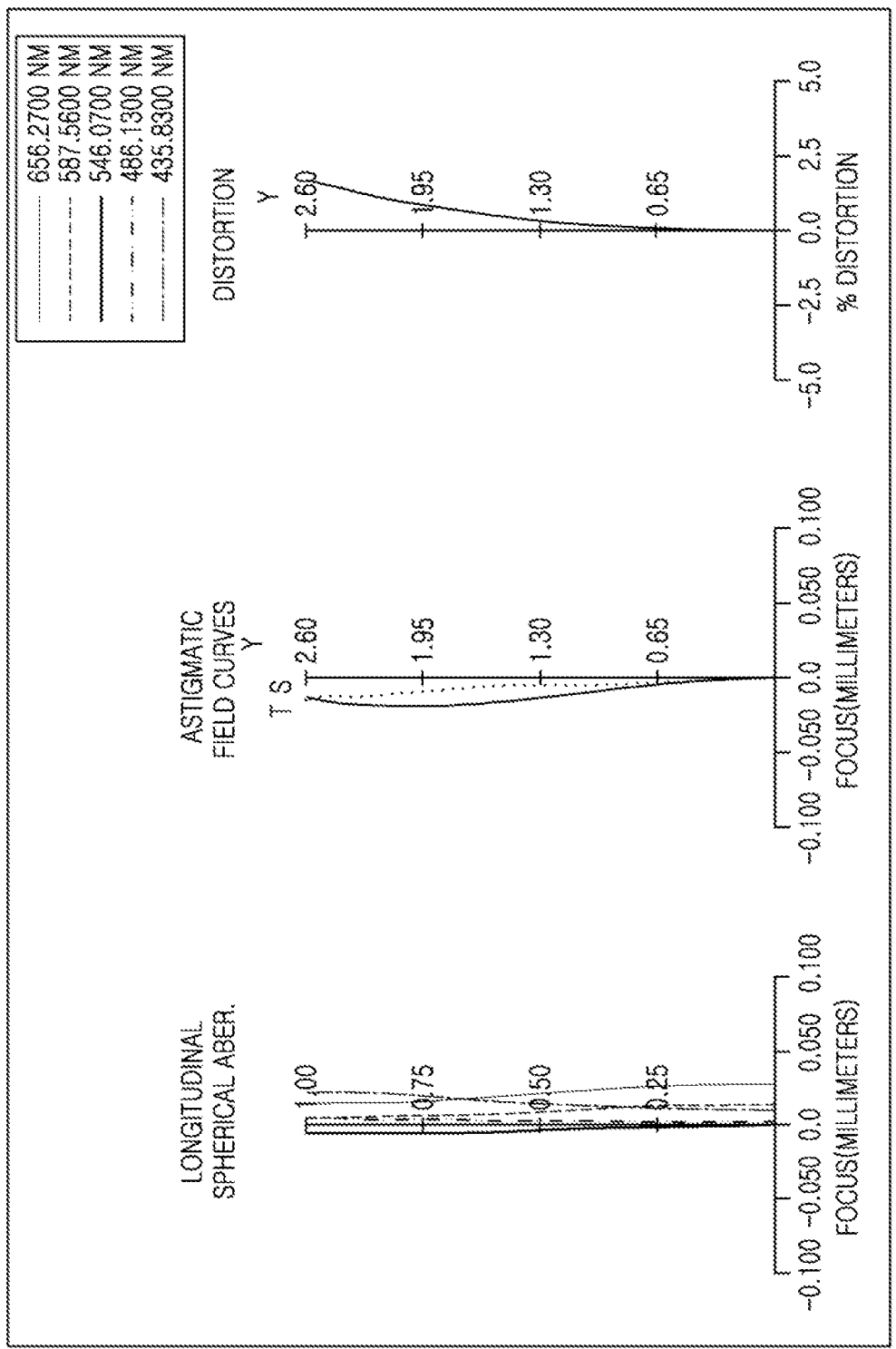
FIG. 10 is graphs representing aberration curves of the optical imaging system illustrated in FIG. 9.

The optical imaging system 300 configured as described above has aberration characteristics as illustrated in FIG. 10. FIGS. 11 and 12 are tables representing characteristics of lenses and aspherical characteristics of the optical imaging system according to the third embodiment.

As set forth above, according to one or more embodiments, an optical imaging system may reduce a wide angle distortion phenomenon.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens, a prism, a second lens, a third lens, a fourth lens, a fifth lens, a reflecting member, and an imaging plane disposed in this order from an object side to an image side,
wherein an object-side surface of the first lens is concave,
wherein an image-side surface of the fifth lens is convex,
wherein the prism is configured to redirect light from the first lens to the second lens,
wherein the reflecting member is configured to reflect light from the fifth lens to the imaging plane,
wherein the optical imaging system has a total number of five lenses having refractive power, and
wherein a ratio of a distance between an object-side surface of the first lens and an image-side surface of the prism to an overall focal length of the optical imaging system is less than 0.5.

2. The optical imaging system of claim 1, wherein the first lens has a negative refractive power.

3. The optical imaging system of claim 1, wherein the second lens has a positive refractive power.

4. The optical imaging system of claim 1, wherein the third lens has a positive refractive power.

5. The optical imaging system of claim 1, wherein the fourth lens has a negative refractive power.

6. The optical imaging system of claim 1, wherein the fifth lens has a positive refractive power.

7. The optical imaging system of claim 1, wherein an image-side surface of the first lens is concave.

8. The optical imaging system of claim 1, wherein two surfaces of the second lens are convex.

9. The optical imaging system of claim 1, wherein an object-side surface of the third lens is convex.

10. The optical imaging system of claim 1, wherein two surfaces of the fourth lens are concave.

11. The optical imaging system of claim 1,
wherein the distance between the object-side surface of the first lens and the image-side surface of the prism extends along an optical axis of the first lens from the object-side surface of the first lens to an intersection between the optical axis of the first lens and an optical axis of the second lens, and along the optical axis of the second lens between the intersection and the image side surface of the prism, wherein the optical axis of the first lens differs in direction from the optical axis of the second lens.

12. The optical imaging system of claim 1, wherein a refractive index of the prism is less than two.

13. The optical imaging system of claim 1, further comprising:
a filter disposed between the reflecting member and the imaging plane.

14. The optical imaging system of claim 13, wherein a refractive index of the filter is less than 1.66.

15. The optical imaging system of claim 1, wherein the first lens is substantially perpendicular to the second lens and the fifth lens is substantially perpendicular to the imaging plane.

16. An optical imaging system, comprising:
a first lens having a first optical axis;
a second lens;
a third lens;
a fourth lens;
a fifth lens,
wherein the second lens, third lens, fourth lens and fifth lens are arranged along a second optical axis;
an imaging plane having a third optical axis parallel to the first optical axis;
a prism configured to redirect light from the first lens to the second lens; and
a reflecting member configured to reflect light from the fifth lens to the imaging plane,
wherein the first lens, the prism, the second lens, the third lens, the fourth lens, the fifth lens, the reflecting member, and the imaging plane are disposed in this order from an object side to an image side,
wherein an object-side surface of the first lens is concave,
wherein an image-side surface of the fifth lens is convex,
wherein the optical imaging system has a total number of five lenses having refractive power, and
wherein a ratio of a distance between an object-side surface of the first lens and an image-side surface of the prism to an overall focal length of the optical imaging system is less than 0.5.

17. The optical imaging system of claim 16, wherein the first lens is disposed toward an object-side of the optical imaging system, and the first optical axis is substantially perpendicular to the second optical axis.

18. An optical imaging system, comprising:
a first lens, a prism, a second lens, a third lens, a fourth lens, a fifth lens, a reflecting member, and an imaging plane disposed in this order from an object side to an image side;
wherein the prism is configured to redirect light from the first lens to the second lens,
wherein the reflecting member is configured to reflect light from the fifth lens to the imaging plane,
wherein an optical axis of the first lens is substantially perpendicular to an optical axis of the second lens, and an optical axis of the fifth lens is substantially perpendicular to an optical axis of the imaging plane,
wherein an object-side surface of the first lens is concave,
wherein an image-side surface of the fifth lens is convex,
wherein the optical imaging system has a total number of five lenses having refractive power, and
wherein a ratio of a distance between an object-side surface of the first lens and an image-side surface of the prism to an overall focal length of the optical imaging system is less than 0.5.

* * * * *